US010289674B2

(12) United States Patent
Takeuchi et al.

(10) Patent No.: US 10,289,674 B2
(45) Date of Patent: *May 14, 2019

(54) GENERATION APPARATUS, GENERATION METHOD, AND PROGRAM

(71) Applicant: International Business Machines Corporation, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/868,442

(22) Filed: Sep. 29, 2015

(65) Prior Publication Data

US 2016/0124933 A1 May 5, 2016

(30) Foreign Application Priority Data

Oct. 30, 2014 (JP) ................................. 2014-221051

(51) Int. Cl.
*G06N 7/02* (2006.01)
*G06N 7/04* (2006.01)
(Continued)

(52) U.S. Cl.
CPC .......... *G06F 17/248* (2013.01); *G06F 17/271* (2013.01); *G06F 17/277* (2013.01);
(Continued)

(58) Field of Classification Search
None
See application file for complete search history.

(56) References Cited

U.S. PATENT DOCUMENTS 6,085,201 A * 7/2000 Tso ........................ G06F 17/277
715/205
8,386,234 B2 * 2/2013 Uchimoto ........... G06F 17/2836
704/4
(Continued)

FOREIGN PATENT DOCUMENTS

JP 2002297651 A 10/2002
JP 2006065623 A 3/2006
(Continued)

OTHER PUBLICATIONS

Borden, et al., "Developing a Dashboard to Aid in Effective Project Management", SAS Global Forum 2008, BI Forum, BI User Applications, Paper 052-2008, 13 pages.
(Continued)

*Primary Examiner* — Scott A. Waldron
*Assistant Examiner* — Ababacar Seck
(74) *Attorney, Agent, or Firm* — Scott S. Dobson (57) ABSTRACT

Aspects of the present invention disclose a method, computer program product, and system for generating target text based on target data. The method includes one or more processors decomposing one or more portions of text into at least one corresponding keyword and at least one corresponding template. The method further includes learning a classification model associated with selecting a template based on a category of a keyword. The method further includes identifying a target keyword that is represented by target data. The method further includes selecting a target template that is used to represent the target data based on a category associated with the identified target keyword utilizing the classification model. The method further includes generating target text that represents the target data based on the selected text template based on the selected target template and the identified target keyword.

1 Claim, 6 Drawing Sheets

| | OBJECTIVE VARIABLE | | EXPLANATORY VARIABLE | | | | |
|---|---|---|---|---|---|---|---|
| TEMPLATE | CATEGORY X | CATEGORY Y | CATEGORY Z | (1) | (2) | (3) | ... |
| [Y] part # of the [Y] for [X]<br>(Do not know part # of the ink for printer A01.) | Product | Question for a component | | 35 | 20 | 2.3 | ... |
| [X][Z][Y]<br>(LED bulb L2 went out in a month.) | Product | Duration of service | Problem | 43 | 5.9 | 0.9 | ... |
| The calls for [X] are increasing.<br>(The calls for cancellation are increasing.) | Contract | | | 0 | 0 | 10.2 | ... |
| [Y] [Z] of a [X]<br>(Initial failure of paper recognition of a printer A02.) | Product | Duration of service | Problem | 53 | 2.2 | 0.7 | ... |
| [Y] part # of the [Y] for [X]<br>(Do not know part # of the light for scanner B02.) | Product | Question for a component | | 25 | 6.5 | 5.7 | ... |
| [Y] [Z] of an [X]<br>(Initial failure of lightning of an LED bulb L1.) | Product | Duration of service | Problem | 125 | 1.5 | -0.3 | ... |
| ⋮ | ⋮ | ⋮ | ⋮ | ⋮ | ⋮ | ⋮ | ⋱ |

(51) Int. Cl.
*G06N 7/06* (2006.01)
*G06N 7/08* (2006.01)
*G06F 17/24* (2006.01)
*G06N 99/00* (2019.01)
*G06F 17/27* (2006.01)
*G06F 17/28* (2006.01)

(52) U.S. Cl.
CPC ...... *G06F 17/2755* (2013.01); *G06F 17/2881* (2013.01); *G06N 99/005* (2013.01)

(56) References Cited

U.S. PATENT DOCUMENTS

| | | | |
|---|---|---|---|
| 8,805,853 B2* | 8/2014 | Ishikawa | G06Q 10/10 707/748 |
| 2005/0246161 A1* | 11/2005 | Sakurai | G06Q 30/02 704/10 |
| 2007/0136220 A1* | 6/2007 | Sakurai | G06N 99/005 706/20 |
| 2009/0094233 A1* | 4/2009 | Marvit | G06F 17/3071 |
| 2010/0138428 A1* | 6/2010 | Uchino | G06F 17/30864 707/751 |
| 2013/0151239 A1 | 6/2013 | Kobayashi et al. | |
| 2015/0032753 A1* | 1/2015 | Yang | G06F 17/2705 707/738 |
| 2016/0055850 A1* | 2/2016 | Nakadai | G10L 15/32 704/235 |

FOREIGN PATENT DOCUMENTS

| | | |
|---|---|---|
| JP | 2006244298 A | 9/2006 |
| JP | 2007102642 A | 4/2007 |
| JP | 2007249458 A | 9/2007 |
| JP | 2007305107 A | 11/2007 |
| JP | 2009037605 A | 2/2009 |
| JP | 2009181301 A | 8/2009 |
| JP | 2010128779 A | 6/2010 |
| JP | 2011180748 A | 9/2011 |
| JP | 2011229194 A | 11/2011 |
| JP | 2012078647 A | 4/2012 |
| JP | 2012079161 A | 4/2012 |
| JP | 2012128779 A | 7/2012 |
| JP | 2013025648 A | 2/2013 |

OTHER PUBLICATIONS

Aggarwal, et al, "Mining Text Data", Springer, 123 pages, 2012.
Notification of Reasons for Refusal, English Translation, Patent Application No. 2014-221051, dated Mar. 30, 2016, 3 pages.
Decision to Grant a Patent, English Translation, Patent Application No. 2014-221051, dated May 23, 2016, 3 pages.
Takeuchi et al., "Generation Apparatus, Generation Method, and Program", Patent Application No. 2014-221051, Filed Oct. 30, 2014, 55 pages.
Takeuchi et al., "Generation Apparatus, Generation Method, and Program", U.S. Appl. No. 15/341,147, filed Nov. 2, 2016.
List of IBM Patents or Patent Applications Treated as Related, dated Nov. 1, 2016, pp. 1-2.

* cited by examiner

| [Question for a component] →<br>↓ [Product] | Where is ... power button | Do not know ... ink | How to change ... battery | ... |
|---|---|---|---|---|
| Printer A01 | 2<br>(0.3) | 35<br>(20) | 0<br>(0) | ⋮ |
| Printer A02 | 1<br>(0.1) | 3<br>(3.5) | 0<br>(0) | ⋮ |
| Note PC A01 | 3<br>(1.2) | 0<br>(0) | 128<br>(2.3) | ⋮ |
| ... | ... | ... | ... | ⋱ |

EACH NUMBER INDICATES NUMBER OF CO-OCCURRENCES (EACH NUMBER IN PARENTHESES INDICATES CORRELATION VALUE)

FIG. 3

| TEMPLATE | CATEGORY X | CATEGORY Y | CATEGORY Z | (1) | (2) | (3) | ... |
|---|---|---|---|---|---|---|---|
| [Y] part # of the [Y] for [X]<br>(Do not know part # of the ink for printer A01.) | Product | Question for a component | | 35 | 20 | 2.3 | ... |
| [X][Z][Y]<br>(LED bulb L2 went out in a month.) | Product | Duration of service | Problem | 43 | 5.9 | 0.9 | ... |
| The calls for [X] are increasing.<br>(The calls for cancellation are increasing.) | Contract | | | 0 | 0 | 10.2 | ... |
| [Y] [Z] of a [X]<br>(Initial failure of paper recognition of a printer A02.) | Product | Duration of service | Problem | 53 | 2.2 | 0.7 | ... |
| [Y] part # of the [Y] for [X]<br>(Do not know part # of the light for scanner B02.) | Product | Question for a component | | 25 | 6.5 | 5.7 | ... |
| [Y] [Z] of an [X]<br>(Initial failure of lightning of an LED bulb L1.) | Product | Duration of service | Problem | 125 | 1.5 | -0.3 | ... |
| ... | ... | ... | ... | ... | ... | ... | ⋰ |

OBJECTIVE VARIABLE | EXPLANATORY VARIABLE

GENERATION APPARATUS, GENERATION METHOD, AND PROGRAM

CROSS-REFERENCE TO RELATED APPLICATION

This application claims priority under 35 U.S.C. § 119 to Japan Patent Application No. 2014-221051 filed Oct. 30, 2014, the entire contents of which are incorporated herein by reference.

BACKGROUND OF THE INVENTION

The present invention relates to a generation apparatus, a generation method, and a program.

A report based on statistical information, such as graph and tabular forms, can be conventionally made in such a manner that a person (e.g., reporter) can extract potential features to report on from the statistical information, or additionally to create a text report at the discretion of the reporter. Extracting predetermined information from a statistical report, and the conversion of the information to a predetermined structure is a method utilized to create such reports.

SUMMARY

Aspects of the present invention disclose a method, computer program product, and system for generating target text based on target data. The method includes one or more processors decomposing one or more portions of text into at least one corresponding keyword and at least one corresponding template. The method further includes one or more processors learning a classification model associated with selecting a template based on a category of a keyword. The method further includes one or more processors identifying a target keyword that is represented by target data. The method further includes one or more processors selecting a target template that is used to represent the target data based on a category associated with the identified target keyword utilizing the classification model. The method further includes one or more processors generating target text that represents the target data based on the selected text template based on the selected target template and the identified target keyword.

DETAILED DESCRIPTION

Embodiments of the present invention recognize that, even when predetermined information is extracted from statistical information and converted to a predetermined structure, there can be a difficulty in creating text automatically because a decision by an individual (e.g., a reporter) that has specialized knowledge and the like can be required to create a report text. Further, when statistical information contains a new word, such as a new product that does not exist in a database, it is often desired to create a report for the new word. However, since there is no information on the new word, it is more difficult to create the report automatically.

Embodiments of the present invention provide a generation apparatus, a generation method, and a program, where the generation apparatus is for generating a target text representing target data, including: a decomposition processing section for decomposing each of multiple texts into a keyword and a template; a learning processing section for learning a classification model to select a template based on the category of a keyword; an identification section for identifying a target keyword representing the target data; a selection section for selecting a target template used to represent the target data based on the category of the target keyword using the classification model; and a generation section for generating the target text representing the target data based on the target template and the target keyword.

The present invention will be described below in connection with a preferred embodiment. It should be noted that the following embodiment is not intended to limit the invention in the appended claims. Further, all the combinations of the features described in the embodiment are not necessarily essential to the means for solving the problem in the present invention.

Figure 1:
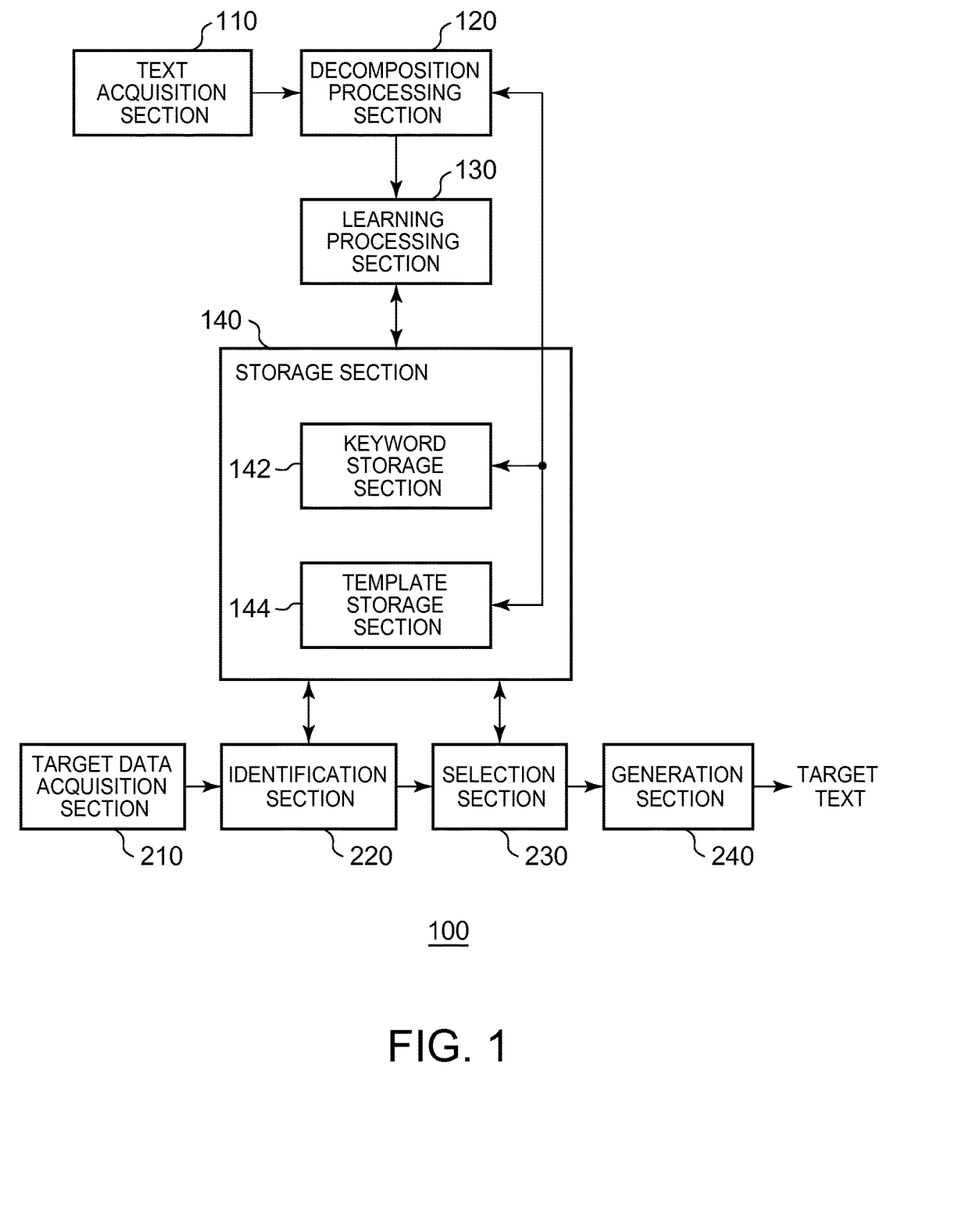
FIG. 1 shows a configuration example of a generation apparatus 100 according to an embodiment.

FIG. 1 shows a configuration example of a generation apparatus 100 according to an embodiment of the present invention. The generation apparatus 100 automatically creates text representing the features of target data based on the target data as statistical information, such as graph and tabular forms, acquired from the outside. In the embodiment, the text representing the target data is set as a target text. The generation apparatus 100 includes a text acquisition section 110, a decomposition processing section 120, a learning processing section 130, a storage section 140, a target data acquisition section 210, an identification section 220, a selection section 230, and a generation section 240.

The text acquisition section 110 acquires multiple texts. Here, the multiple texts are texts representing the features of statistical information and the like that have been reported in the past. The multiple texts may be created by experts and/or skilled persons, such as texts in which graphs of product-by-product inquiries and the number of complaints are evaluated and described, texts in which graphs indicative of monthly orders for products and selling situations are described, texts in which present and/or future weather information is described from a distribution of weather data on various regions, and texts in which graphs of stock price movement and exchange rate fluctuations with time are described and future activities are predicted. For example, the text acquisition section 110 acquires texts, such as "customers do not know the part # of the ink for Printer A01," and "the order for scanner B02 is improved as compared with three months before."

The text acquisition section 110 may acquire multiple texts created by users using a business analysis tool, a marketing tool, and the like. The text acquisition section 110 is connected, for example, to a storage device (e.g., an external database) to acquire the multiple texts. The text acquisition section 110 may also acquire multiple texts entered by users. The text acquisition section 110 may operate integrally with the generation apparatus 100. Alternatively, the text acquisition section 110 may operate separately from the main body of the generation apparatus 100. In this case, the text acquisition section 110 may be connected to the main body of the generation apparatus 100 through a network or the like.

In one embodiment, the decomposition processing section 120 decomposes each of multiple texts into a keyword and a template. In another embodiment, the decomposition processing section 120 may decompose each of multiple texts into a set of keywords and a template. The decomposition processing section 120 may be connected to the text acquisition section 110 to extract one or more keywords from an acquired text based on a pre-stored list of multiple keywords or the like. The decomposition processing section 120 further acquires a category corresponding to each of the extracted keywords based on the list of multiple keywords or the like.

The decomposition processing section 120 may also extract a template from the acquired text based on a pre-stored list of multiple templates or the like. Here, the decomposition processing section 120 may set, as a template, a text in which a category corresponding to a keyword extracted from the text is applied to the position of the keyword.

The decomposition processing section 120 may decompose a text into one or more keywords and a template using language processing. Further, the decomposition processing section 120 may decompose the text into a keyword that does not exist in the list of keywords and a template that does not exist in the list of templates by language processing or the like. In this case, the decomposition processing section 120 may add the decomposed keyword and/or template to the corresponding lists, respectively.

The learning processing section 130 learns a classification model to select a template based on the category of a keyword. The learning processing section 130 is connected to the decomposition processing section 120 to acquire multiple keywords and multiple templates respectively decomposed from the multiple texts. The learning processing section 130 learns the classification model to select a template decomposed from one text according to a category corresponding to a keyword included in the one text. The learning processing section 130 may learn the classification model to select a template based on the category of a keyword and the statistic of an event corresponding to the keyword.

Further, when the decomposition processing section 120 decomposes a text into a set of keywords and a template, the learning processing section 130 learns the classification model to select a template based on a set of categories corresponding to the set of keywords and the statistics of events corresponding to the set of keywords. The learning by the learning processing section 130 will be described later.

The storage section 140 is connected to the learning processing section 130 to receive and store the classification model learned by the learning processing section 130. The storage section 140 may also store intermediate data in the process of learning by the learning processing section 130, calculation results, and the like, respectively. Further, the storage section 140 may supply the stored data to a requestor in response to a request from each section in the generation apparatus 100. The storage section 140 may have a keyword storage section 142 and a template storage section 144. The storage section 140 may be provided in the main body of the generation apparatus 100. Alternatively, the storage section 140 may be a database or the like connected to a network.

The keyword storage section 142 stores keywords belonging to each of multiple categories in association with the category. The keyword storage section 142 may store predetermined keywords or may be connected to the decomposition processing section 120 to store keywords decomposed by the decomposition processing section 120. The keyword storage section 142 may be a list of keywords referred to by the decomposition processing section 120. The keyword storage section 142 may be a keyword dictionary and/or a category dictionary to store multiple keywords together with corresponding categories.

The template storage section 144 stores templates obtained by decomposing multiple texts. The template storage section 144 may store predetermined templates or may be connected to the decomposition processing section 120 to store templates decomposed by the decomposition processing section 120. The template storage section 144 may be a list of templates to be referred to by the decomposition processing section 120. The template storage section 144 may be a template dictionary to store multiple templates.

The target data acquisition section 210 acquires target data. Here, the target data can include statistical information, such as graph and tabular forms. Further, the statistical information includes one or more keywords and the like, and a target keyword representing the target data is included in the keywords. In other words, the statistical information includes keywords as candidates for the target keyword. The target data acquisition section 210 may acquire the statistic of an event corresponding to a keyword. In other words, the target data acquisition section 210 may acquire a target statistic as the statistic of an event corresponding to a target keyword in the target data.

The target data acquisition section 210 may be connected to a business analysis tool, a marketing tool, and the like to acquire statistical information used to create a report to be output by the tools and the like. Further, the target data acquisition section 210 may be connected to a storage device (e.g., an external database) to acquire statistical information. Further, the target data acquisition section 210 may acquire statistical information entered by users.

The identification section 220 identifies a target keyword representing the target data. The identification section 220 is connected to the target data acquisition section 210 to set as the target keyword a keyword contained in the statistical information. When the statistical information contains multiple keywords, the identification section 220 may identify a set of target keywords. In this case, the identification section 220 may also identify two or more combinations of keywords to be set as target keywords.

The selection section 230 is connected to the storage section 140 and the identification section 220 to select a target template used to represent the target data using the classification model learned by the learning processing section 130 based on the category of a target keyword identified by the identification section 220. The selection section 230 may select a target template based on the category of a target keyword and a target statistic. Further, when the identification section 220 identifies a set of target keywords, the selection section 230 may select a target template having a set of categories based on the set of categories corresponding to the set of target keywords and target statistics.

The generation section 240 is connected to the selection section 230 to generate a target text representing the target data based on the target template and the target keyword. As an example, the generation section 240 applies a target keyword corresponding to a category contained in a target template to the target template to generate a target text. Further, when the identification section 220 identifies a set of target keywords, the generation section 240 generates a target text based on the set of target keywords and the target template. As an example, the generation section 240 applies respectively corresponding target keywords to a set of categories contained in the target template to generate a target text.

The above generation apparatus 100 of the embodiment acquires multiple texts created based on statistical information and the like, and learns a classification model to create each of the texts based on a keyword(s) contained in the text. Then, the generation apparatus 100 generates a target text representing target data using the learned classification model based on the keyword(s) contained in the target data. The operation of the generation apparatus 100 will be described in further detail with reference to FIG. 2.

Figure 2:
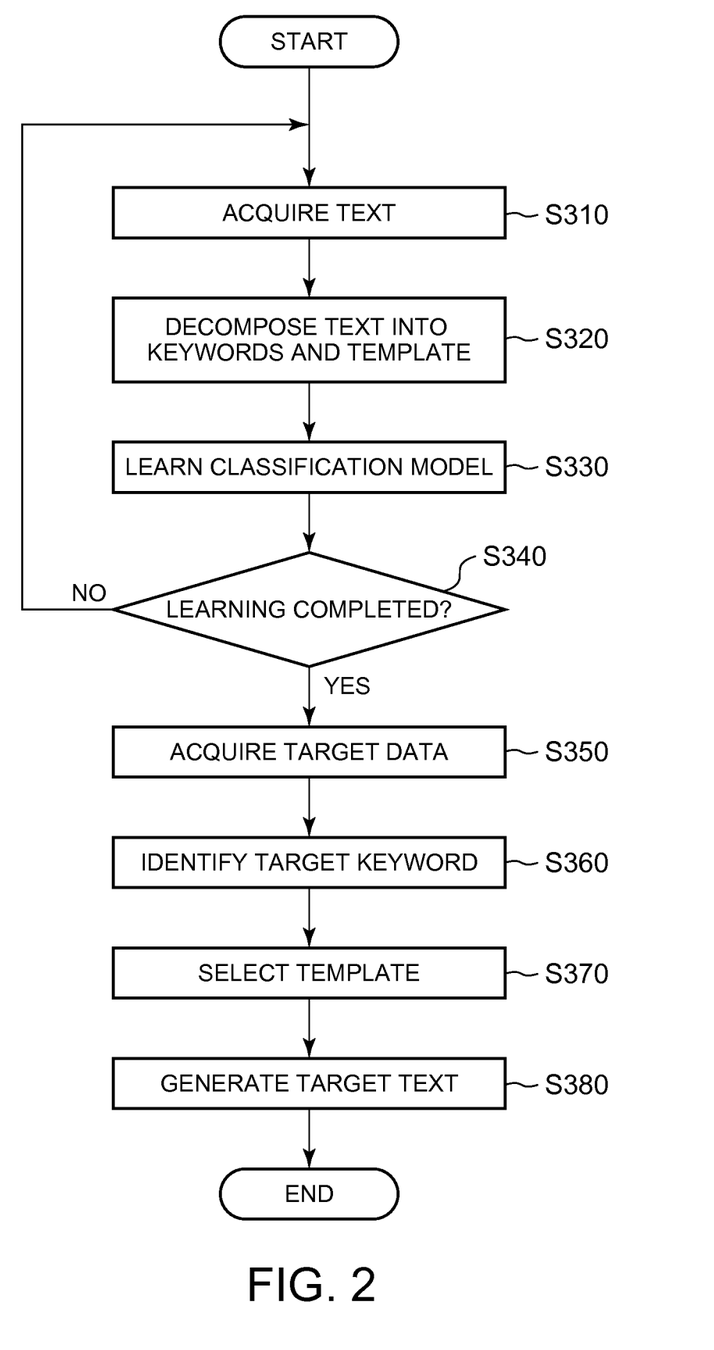
FIG. 2 shows an operation flow of the generation apparatus 100 according to the embodiment.

FIG. 2 shows an operation flow of the generation apparatus 100 according to an embodiment of the present invention. In the embodiment, the generation apparatus 100 executes processing steps S310 to S380 to learn a classification model in order to generate a target text representing target data. In the embodiment, an example where the generation apparatus 100 generates a text representing statistical information on the number of product-by-product inquiries will be described.

In process S310, the text acquisition section 110 acquires multiple texts. For example, the text acquisition section 110 acquires texts created in the past, such as "Do not know the part # of the ink for printer A01" as a first text, "LED bulb L2 went out in a month" as a second text, and "The calls for cancellation are increasing" as a third text.

In process S320, the decomposition processing section 120 decomposes each of multiple texts into keywords and a template. For example, the decomposition processing section 120 extracts a keyword from the acquired text using a keyword dictionary stored for each category in the keyword storage section 142.

In an example embodiment, the keyword storage section 142 stores keywords such as "printer A01" and "LED bulb L2" in a "Product" category, a keyword such as "cancellation" in a "Contract" category, keywords such as "do not know . . . ink" in a "Question for a component" category, keywords such as "in a month" in a "Duration of service" category, and keywords such as "went out" in a "Problem" category, respectively. Note that the Product category is set as a first category, the Contract category as a second category, the Question for a component category as a third category, the Duration of service category as a fourth category, and the Problem category as a fifth category. In this example embodiment, the decomposition processing section 120 extracts, as keywords, "printer A01" and "do not know . . . ink" from the first text. Similarly, the decomposition processing section 120 extracts, as keywords, "LED bulb L2," "went out," and "in a month" from the second text, and "cancellation" from the third text, respectively.

Thus, the decomposition processing section 120 detects keywords stored in the keyword storage section 142 from each of the multiple texts. Then, the decomposition processing section 120 determines a template based on portions of each text other than the keyword portions. For example, the decomposition processing section 120 sets, as a template, a text in which categories corresponding to keywords extracted from each text are applied to the positions of the keywords. In other words, the decomposition processing section 120 searches each text for each keyword included in the keyword dictionary. Then, when the keyword is hit, the decomposition processing section 120 replaces a keyword portion in the text by a corresponding category.

As an example, the decomposition processing section 120 sets, as a first template, "[Y] the part # of the [Y] for [X]" (where [X] is the Product category and [Y] is the Question for a component category) based on the first text. Similarly, based on the second and third texts, the decomposition processing section 120 sets "[X] [Z] [Y]" (where [X] is the Product category, [Y] is the Duration of service category, and [Z] is the Problem category), and "The calls for [X] are increasing" (where [X] is the Contract category) as second and third templates, respectively.

Thus, the decomposition processing section 120 decomposes the acquired multiple texts into the keywords and templates, respectively. Note that the decomposition processing section 120 may store the decomposed templates in the template storage section 144.

In the above description, the decomposition processing section 120 replaces a keyword in each text by a corresponding category to decompose the text into a template. Alternatively, the decomposition processing section 120 may use the template dictionary stored in the template storage section 144 to decompose the acquired text into a template.

For example, the template storage section 144 stores, in the template dictionary, "[Y] the part # of the [Y] for [X]," "[X] [Z] [Y]," "The calls for [X] are increasing," and the like. The decomposition processing section 120 may perform decomposition to set a template obtained by matching between a remaining text, obtained by removing extracted keywords from each text, and a template stored in the template storage section 144, as a template for the text.

Alternatively, the decomposition processing section 120 may perform decomposition processing for keywords and a template by using known language processing or the like. For example, the decomposition processing section 120 performs morphological analysis by natural language processing to recognize separation between words, and performs syntax analysis to recognize a text structure. On that basis, the decomposition processing section 120 searches a dictionary for a predetermined part of speech such as noun, and when the part of speech is hit, replaces the part of speech by a corresponding category. In this case, the decomposition processing section 120 may store, in the corresponding keyword storage section 142 or template storage section 144, information on a decomposed keyword, a category corresponding to the keyword, and/or a template.

In process S330, the learning processing section 130 learns a classification model for selecting a template based on the category of each keyword. The learning processing section 130 learns the classification model to select a template decomposed from one text according to one or more categories corresponding to one or more keywords included in the one text.

The learning processing section 130 may learn a classification model for selecting a template based on the statistics of events corresponding to one or more keywords. In this case, the text acquisition section 110 acquires, in addition to the multiple texts, the statistics of events corresponding to one or more keywords as statistical information as the bases of the created multiple texts.

Figure 3:
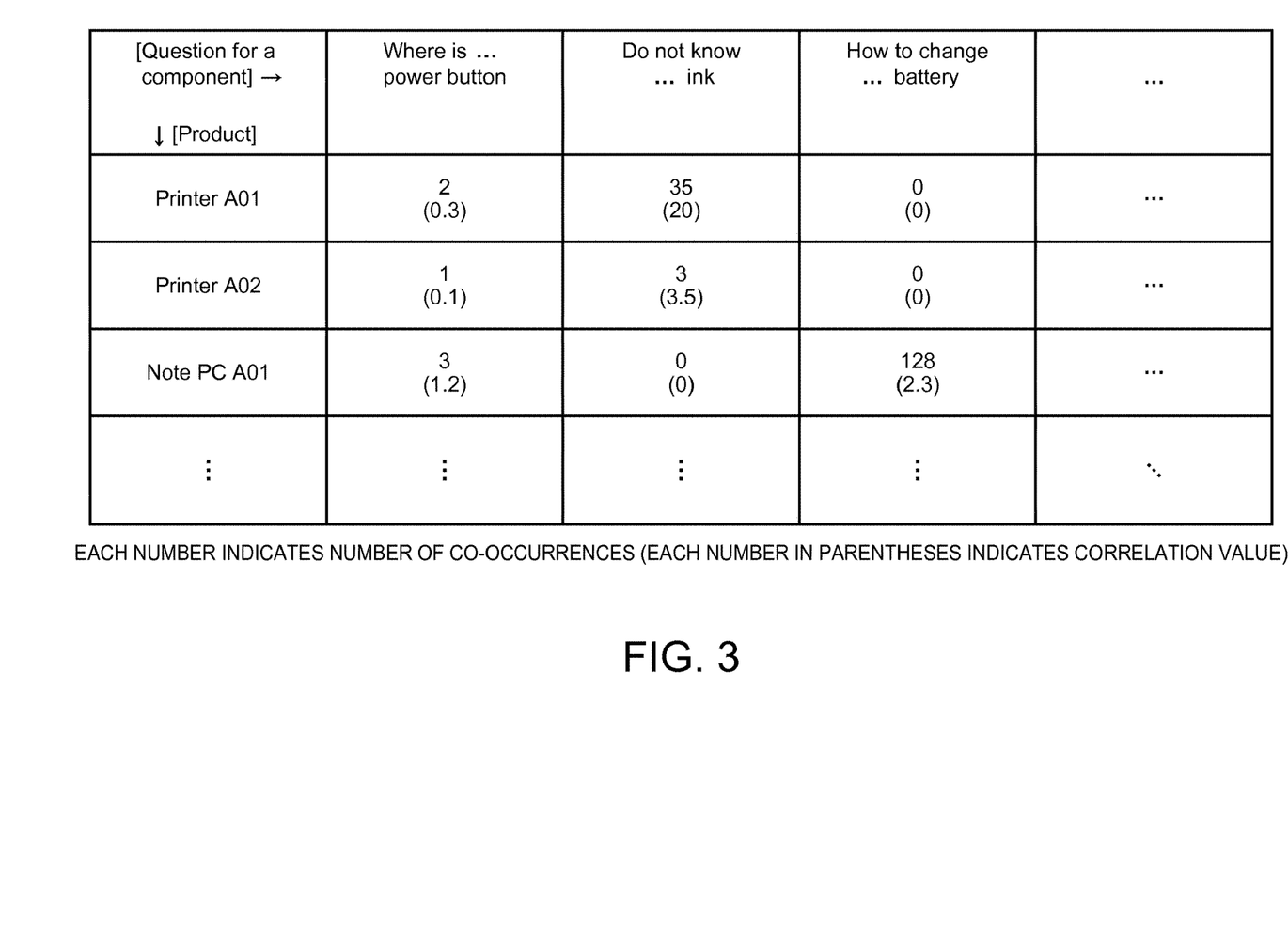
FIG. 3 shows an example of statistics of events acquired by a text acquisition section 110 according to the embodiment.

FIG. 3 shows an example of the statistics of events acquired by the text acquisition section 110 according to an embodiment of the present invention. As an example, FIG. 3 shows keywords in the: Question for a component: category in the lateral direction, such as "Where is . . . power button" (Question for the position of a power supply button of . . . ), "Do not know . . . ink," and "How to change . . . battery" (Charging method for the battery of . . . ). Further, as an example, FIG. 3 shows keywords in the Product category in the longitudinal direction, such as "Printer A01," "Printer A02," and "Note PC A01."

Each number shown in FIG. 3 indicates the number of co-occurrences, and each number in parentheses indicates a correlation value. For example, FIG. 3 shows that the number of times of co-occurrence of the keywords "Printer A01" and "Do not know . . . ink" in product-by-product inquiries is 35, and the correlation value is 20. Further, for example, FIG. 3 shows that the number of times of co-occurrence of the keywords "Note PC A01" and "How to change . . . battery" in the product-by-product inquiries is 128, and the correlation value is 2.3.

Here, "co-occurrence" means that the keywords ("Printer A01" and "Where is . . . power button") concurrently appear in a text representing one inquiry, evaluation, the description of a phenomenon, or the like. The learning processing section 130 can use the number of co-occurrences to associate, with a template, a combination of keywords likely to appear in texts in order to perform learning. Further, the correlation value indicates a ratio of the number of co-occurrences of the keywords to the number of product-by-product inquiries. The learning processing section 130 can use such a correlation value to associate a combination of keywords highly correlated in the text with a template in order to perform learning.

Here, it is found that the keywords "Printer A01" and "Do not know . . . ink" have higher values than the others in terms of both the number of co-occurrences and the correlation value. Therefore, the learning processing section 130 can learn the keywords as keywords more likely to appear in a template including categories corresponding to the keywords.

On the other hand, it is found that the keywords "Note PC A01" and "How to change . . . battery" have a higher value of the number of co-occurrences than the others, but the correlation value of which is not so high. In other words, it is found that the number of appearances of "How to change . . . battery" in inquiries about "Note PC A01" is 128, but in the inquiries about the others, the values are larger than 128. Thus, the learning processing section 130 can use the number of co-occurrences and the correlation to learn more accurately whether each keyword is a keyword more likely to appear.

The text acquisition section 110 may further acquire a statistic indicative of an increase or decrease (time-series variation) in the number of appearances of each keyword. This enables the learning processing section 130 to learn whether an event corresponding to the keyword actually increases.

Thus, the text acquisition section 110 acquires the statistics indicative of the number of co-occurrences of a set of keywords, a correlation between keywords, and an increase or decrease in an event corresponding to each of the keywords. Then, based on the statistics, the learning processing section 130 generates an objective variable and an explanatory variable to learn a classification model capable of obtaining a corresponding objective variable for an explanatory variable. Here, the explanatory variable may be generated according to a combination of keywords, and the objective variable may be generated according to a corresponding template.

For example, the learning processing section 130 sets the dimensions of an explanatory variable to n×k+m according to the maximum value n of categories contained in the template, the types k of categories, and the types m of statistics used. In the embodiment, an example where the learning processing section 130 generates an explanatory variable having 18 dimensions according to n=3, k=5, and m=3 will be described.

As an example, the learning processing section 130 uses a column vector having 18 elements as the explanatory variable. In this case, the learning processing section 130 may make first to fifth elements correspond to a first category to a fifth category, respectively, to set 1 or 0 depending on the category positioned in [X] of the template. For example, when the category positioned in [X] is the first category, the learning processing section 130 sets the first to fifth elements as [1, 0, 0, 0, 0].

Similarly, the learning processing section 130 makes sixth to 10th elements correspond to a category positioned in [Y] of the template, and eleventh to 15th elements to a category positioned in [Z] of the template. For example, when the category positioned in [Y] is a third category, the learning processing section 130 sets the sixth to 10th elements as [0, 0, 1, 0, 0], and when there is no category positioned in [Z], sets the 11th to 15th elements to all zeros.

Further, for example, the learning processing section 130 sets the 16th element as a value of the number of co-occurrences, the 17th element as a correlation value, and the 18th element as a time-series variation of the event. As an example, the learning processing section 130 may set the values of the 16th to 18th elements in the explanatory function for the keywords "Printer A01" and "Do not know . . . ink" as [35, 20, 2.3].

As an example, based on the keywords and the first template decomposed from the first text, the learning processing section 130 sets the category to be placed in [X] of the first template as the first category corresponding to "Printer A01," the category to be placed in [Y] as the third category corresponding to "Do not know . . . ink," and no category to be placed in [Z]. Further, the learning processing section 130 acquires 35, 20, and 2.3 as the values of the statistics (the number of co-occurrences, the correlation, and time-series variation) in this order corresponding to the keywords "pPrinter A01" and "Do not know . . . ink" decomposed from the first text. Thus, the learning processing section 130 sets the first to 18th elements of a first explanatory function corresponding to the first text as [1, 0, 0, 0, 0, 0, 0, 1, 0, 0, 0, 0, 0, 0, 0, 35, 20, 2.3] in this order.

Then, the learning processing section 130 generates a first objective function indicative of the first template in response to the first explanatory function. For example, the learning processing section 130 sets, as the objective function, a column vector having elements larger in number than or equal to those of the template. As an example, the learning processing section 130 uses a column vector having elements whose number is 18 as an objective variable. In this case, the learning processing section 130 may associate the first to 18th elements with the first template to the 18th template, respectively, to set 1 or 0 depending on the template. For example, in the case of an objective variable indicative of the first template, the learning processing section 130 generates, as a first objective variable, a column vector, in which the first element is set to 1 and the other elements are set to 0.

Thus, the learning processing section 130 can generate the first explanatory variable and the first objective variable according to the keywords and the first template decomposed from the first text. Similarly, the learning processing section 130 generates sets of multiple corresponding explanatory variables and objective variables according to the decomposition results of the multiple texts.

Figure 4:
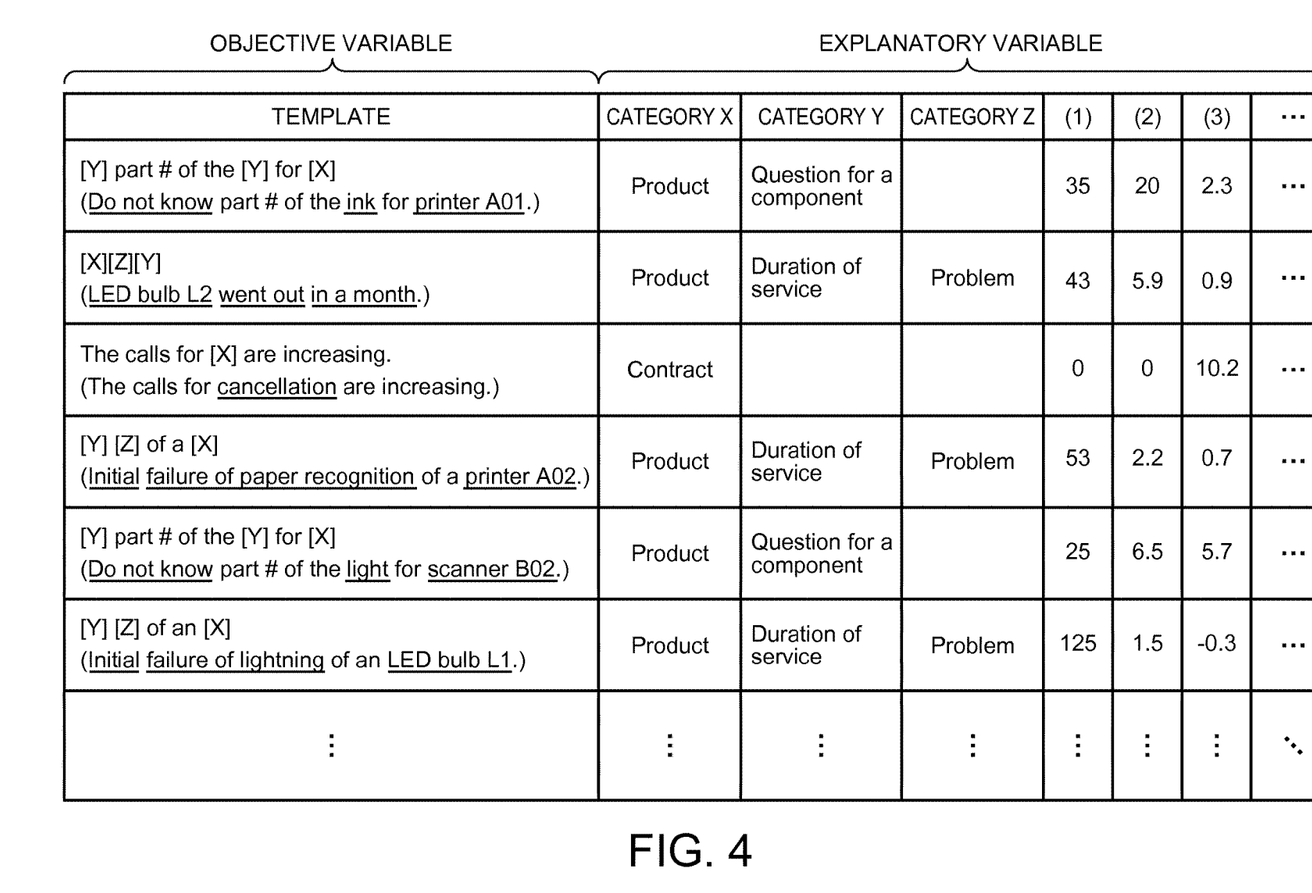
FIG. 4 shows an example of multiple objective variables and explanatory variables generated by a learning processing section 130 according to the embodiment.

FIG. 4 shows an example of multiple objective variables and explanatory variables generated by the learning processing section 130 according to the embodiment. FIG. 4 shows an example where sets of objective variables corresponding to explanatory variables are arranged in the horizontal direction (in rows).

FIG. 4 shows templates and texts corresponding to the objective variables in columns of the objective variables. For example, the first template and the first text are shown in a first row. Note that each text is displayed in parentheses, and keywords to be decomposed are indicated by underlines added to the text. As described in the above example, for example, the learning processing section 130 generates the Nth objective variable with the Nth element set to 1 and the other elements set to 0 to show the Nth template.

Further, FIG. 4 shows an example where categories to be placed in positions [X], [Y], and [Z] of each template, and three values of statistics (the number of co-occurrences, the correlation, and the time-series variation of an event) are arranged as an explanatory variable. As described in the above example, in response to the fact that the category X is the first category (Product), the learning processing section 130 sets the first element of the explanatory variable to 1 and the second to fifth elements to 0. Further, in response to the fact that the category X is the second category (Contract), the learning processing section 130 sets the second element of the explanatory variable to 1, and the first, and third to fifth elements to 0.

Further, in response to the fact that the category Y is the third category (Question for a component), the learning processing section 130 sets the eighth element of the explanatory variable to 1, and the sixth, seventh, ninth, and 10th elements to 0. Further, in response to the fact that the category Y is the fourth category (Duration of service), the learning processing section 130 sets the ninth element of the explanatory variable to 1, and the sixth to eighth, and 10th elements to 0. Further, in response to the fact that the category Z is the fifth category (Problem), the learning processing section 130 sets the 15th element of the explanatory variable to 1, and the 11th to 14th elements to 0.

As described above, the learning processing section 130 generates sets of corresponding explanatory variables and objective variables based on the multiple texts. Then, the learning processing section 130 learns a classification model so that one objective variable corresponding to one explanatory variable will be selected (predicted). For example, the learning processing section 130 performs learning using a classification model by regression analysis. As an example, the learning processing section 130 performs learning by using a known model that is a generalized linear model such as logistic regression as the classification model.

When there is a text to be further acquired, i.e., the learning is not completed (process S340, no branch), the generation apparatus 100 may continue learning by returning to the text acquisition step (S310). When there is no text to be further acquired, i.e., the learning is completed (process S340, yes branch), the generation apparatus 100 may complete the learning. In the case of the learning being completed, the learning processing section 130 stores the learned learning model in the storage section 140. Further, when the learning process does not converge even after a predetermined time has elapsed, the generation apparatus 100 may interrupt the learning and give notice to a user such as warning.

In process S350, the target data acquisition section 210 acquires target data. Similarly to the text acquisition section 110, the target data acquisition section 210 may acquire statistics on the target data. In other words, the target data acquisition section 210 can acquire a target statistic indicative of at least one of the number of co-occurrences of a set of target keywords, a correlation between keywords in the set of target keywords, and an increase or decrease in an even corresponding to each of the target keywords. After the identification section 220 identifies a target keyword, the target data acquisition section 210 may acquire a target statistic in response to receiving information on the target keyword from the identification section 220.

In process S360, the identification section 220 identifies a target keyword representing the target data. Similarly to the operation of the decomposition processing section 120, the identification section 220 may identify a target keyword using the keyword dictionary stored in the keyword storage section 142. Instead of, or in addition to this, the identification section 220 may identify the target keyword by language processing or the like. Here, a target keyword contained in the target data may not exist in the dictionary or the like, such as the name of a new product. When such a target keyword is included in the target data, identification section 220 is capable of identifying the target keyword using language processing or the like.

Further, the identification section 220 identifies a category of the target keyword by using the keyword dictionary or the like. When the target keyword does not exist in the dictionary or the like, the identification section 220 may detect a keyword similar to the target keyword to set a category corresponding to the similar keyword as the category of the target keyword. Thus, for example, when the target keyword is "Printer A02" as a new product of Printer A series, even if the target keyword is not registered in the keyword dictionary, the identification section 220 can identify that the target keyword is in the product category from keywords registered in the keyword dictionary, such as "Printer A01," "Printer A," and "Printer."

In process S370, the selection section 230 uses the classification model learned by the learning processing section 130 to select, based on the category of the target keyword, a target template to be used to represent the target data. The selection section 230 generates a corresponding explanatory variable based on the target keyword. In other words, the selection section 230 defines the values of elements corresponding to the category of the explanatory variable (the first to 15th elements in the above example) according to the category of the target keyword. Further, the selection section 230 uses the target statistic acquired by the target data acquisition section 210 to define the values of elements corresponding to the statistics of the explanatory variable (the 16th to 18th elements in the above example).

The selection section 230 generates the explanatory variable of the target data, and this enables the selection section 230 to predict a target template corresponding to the target data using the learned classification model. In other words, the selection section 230 may calculate an objective variable from the explanatory variable and the classification model to set, as the target template, a template corresponding to the calculated objective variable (corresponding to an element closest to 1).

In process S380, the generation section 240 inserts each target keyword in the predicted target template to generate a target text representing the target data. As an example, the generation section 240 inserts corresponding target keywords into the positions [X], [Y], and [Z] of the categories of the target template to generate a target text. Here, the generation section 240 may make alterations in verb and the like to alter the target data into a grammatically correct expression along with the insertion of the target keywords into the target template. In this case, the generation section 240 may use language processing or the like.

As described above, the generation apparatus 100 of the embodiment can learn a classification model for selecting a target template to be used to represent target data based on multiple texts, insert target keywords into a target template, and generate a target text representing the target data. Thus, the text acquisition section 110 acquires multiple texts included in reports created in the past, and the decomposition processing section 120 decomposes the multiple texts to cause the learning processing section 130 to perform learning so that a classification model corresponding to the reports can be obtained. This enables the generation section 240 to generate a target text to be included in a newly created report.

Thus, from texts created in the past based on past statistical information, the generation apparatus 100 can automatically create a text to be newly created based on new statistical information. In other words, the generation apparatus 100 can learn creator's know-how to read characteristic parts of statistical information based on the knowledge, experience, and ability of the creator to create a similar text based on new statistical information without intervene of the creator. Even when statistical information contains a new word such as a new product that does not exist in a database or the like, the generation apparatus 100 can generate a proper text.

Thus, for example, report preparation work, transfer of the work, the development of the work, and the like can be carried out smoothly. Further, the generation apparatus 100 can accumulate the know-how to create texts for each business field, each area, and each text creator. In addition, more specialized texts can also be generated based on the accumulated information.

Figure 5:
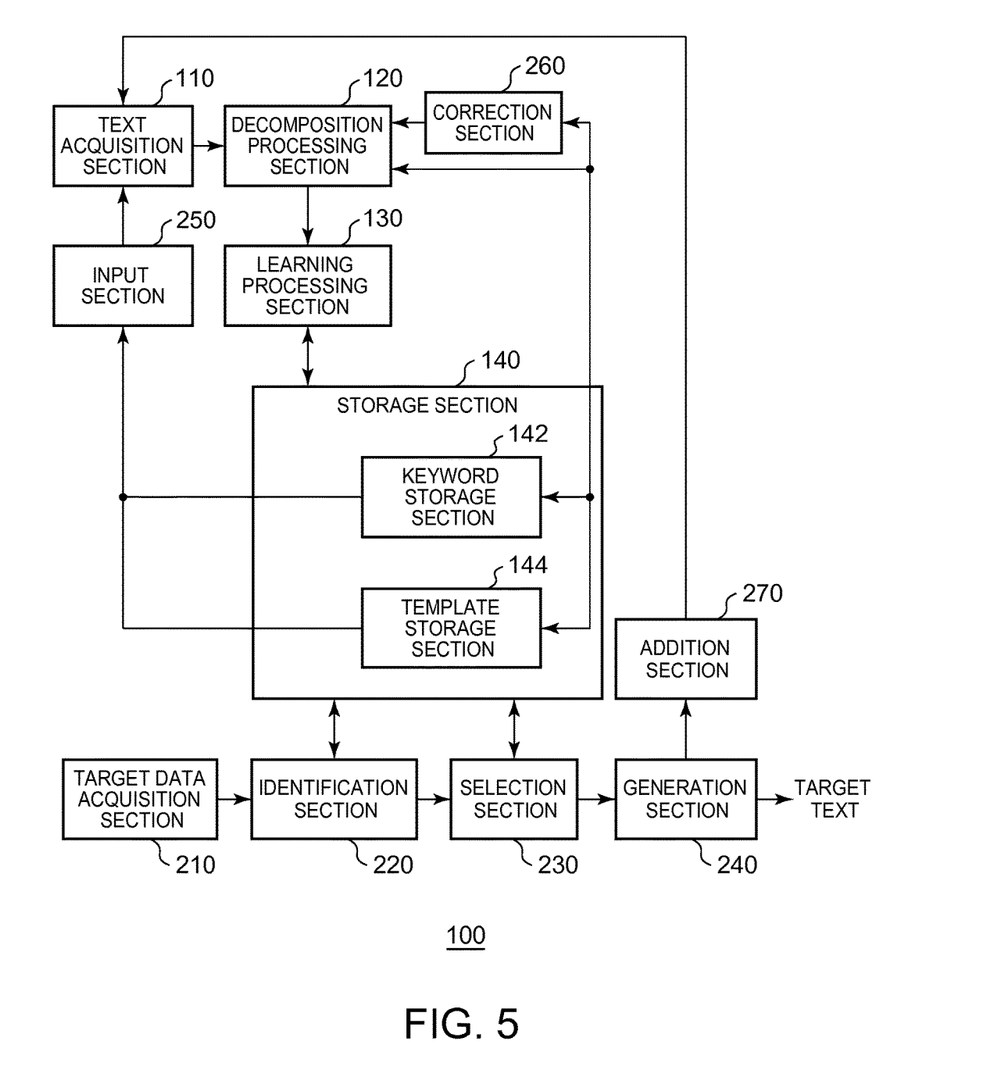
FIG. 5 shows a variation of the generation apparatus 100 according to the embodiment.

FIG. 5 shows a variation of the generation apparatus 100 according to the embodiment. In the generation apparatus 100 of the variation, substantially the same components as those of the generation apparatus 100, according to the embodiment shown in FIG. 1, are given the same reference numeral to omit the description thereof. The generation apparatus 100 of the variation further includes an input section 250, a correction section 260, and an addition section 270.

The input section 250 is connected to the text acquisition section 110 and the storage section 140 to help the text acquisition section 110 acquire a text when a user enters the text or the like directly or modifies the text. When the user enters or modifies a target text, the input section 250 presents, as an input candidate, at least either a keyword(s) stored in the keyword storage section 142 or a template stored in the template storage section 144 while the user is entering the target text.

For example, when the user enters "LED bulb L2," since it is detected that the keyword in the first category is first entered, the input section 250 can predict that a text to be decomposed into the second template is entering. Therefore, according to the array of the second template, the input section 250 displays, as a candidate for the following text part, a keyword in the fifth category, such as "went out" following the result of entering "LED bulb L2" in the first category. This enables the input section 250 to facilitate the user's text input and perform the input operation accurately.

Instead of, or in addition to this, the input section 250 may perform a fuzzy prefix search on the acquired multiple texts to acquire and display a candidate for the following text part. Thus, for example, even if the user enters "LED bulb L5" as a new part # that is not registered in the dictionary, the input section 250 can display a keyword, such as "went out" as a candidate for the following text part.

Based on at least either a keyword stored in the keyword storage section 142 or a template stored in the template storage section 144, the correction section 260 corrects the orthographical variants of a keyword and a template obtained by newly decomposing a text. The correction section 260 is connected to the decomposition processing section 120 and the storage section 140 to correct orthographical variants that occur when the decomposition processing section 120 decomposes the text into the keyword and the template based on information stored in the storage section 140.

For example, when meanings are substantially the same or similar even if the expressions, character strings, or the like are different, such as "Customers cannot find" and "Do not know," "#" and "number," and "Printer A01" "printer A-01," it is desired to recognize substantially the same keywords and templates. Therefore, the correction section 260 corrects orthographical variants in text parts (not registered in the dictionary) other than the parts identified by referring to the keyword dictionary and the template dictionary.

For example, when edit distance between a keyword obtained by newly decomposing a text and a keyword stored in the keyword storage section 142 is less than a predetermined reference distance, the correction section 260 may determine that these keywords are the same. Further, when edit distance between a template obtained by newly decomposing a text and a template stored in the template storage section is less than a predetermined reference distance, the correction section 260 may determine that these templates are the same.

Further, the correction section 260 may determine a difference between singular and plural forms, a difference from an abbreviation, a difference between lowercase and uppercase letters, a difference between a hyphen and an under bar, and the like to be in the same domains to perform fuzzy matching with the keyword dictionary and the template dictionary in order to determine the matches. Further, for example, even if the omission of a predetermined number of letters, misspelling, the addition of letters, and the like are detected, the correction section 260 may determine the matches to determine a match. In addition, the correction section 260 may use a dictionary, in which words, phrases, and the like considered to match with each other are pre-registered, to determine the matches.

The addition section 270 is connected to the generation section 240 and the text acquisition section 110, respectively, to newly add the target text generated by the generation section 240 as one of the multiple texts, and supply it to the text acquisition section 110. Here, the user may edit the target text generated by the generation section 240 such as to alter the target text or the like to perform proper text adjustment. In such a case, the addition section 270 acquires the text altered by the user and newly adds the text as one of the multiple texts.

The learning processing section 130 learns a classification model again using the multiple texts with the text added by the addition section 270. This allows the generation apparatus 100 to further accumulate know-how to create a text.

Further, the learning processing section 130 can learn the text altered by the user again to improve learning accuracy.

Figure 6:
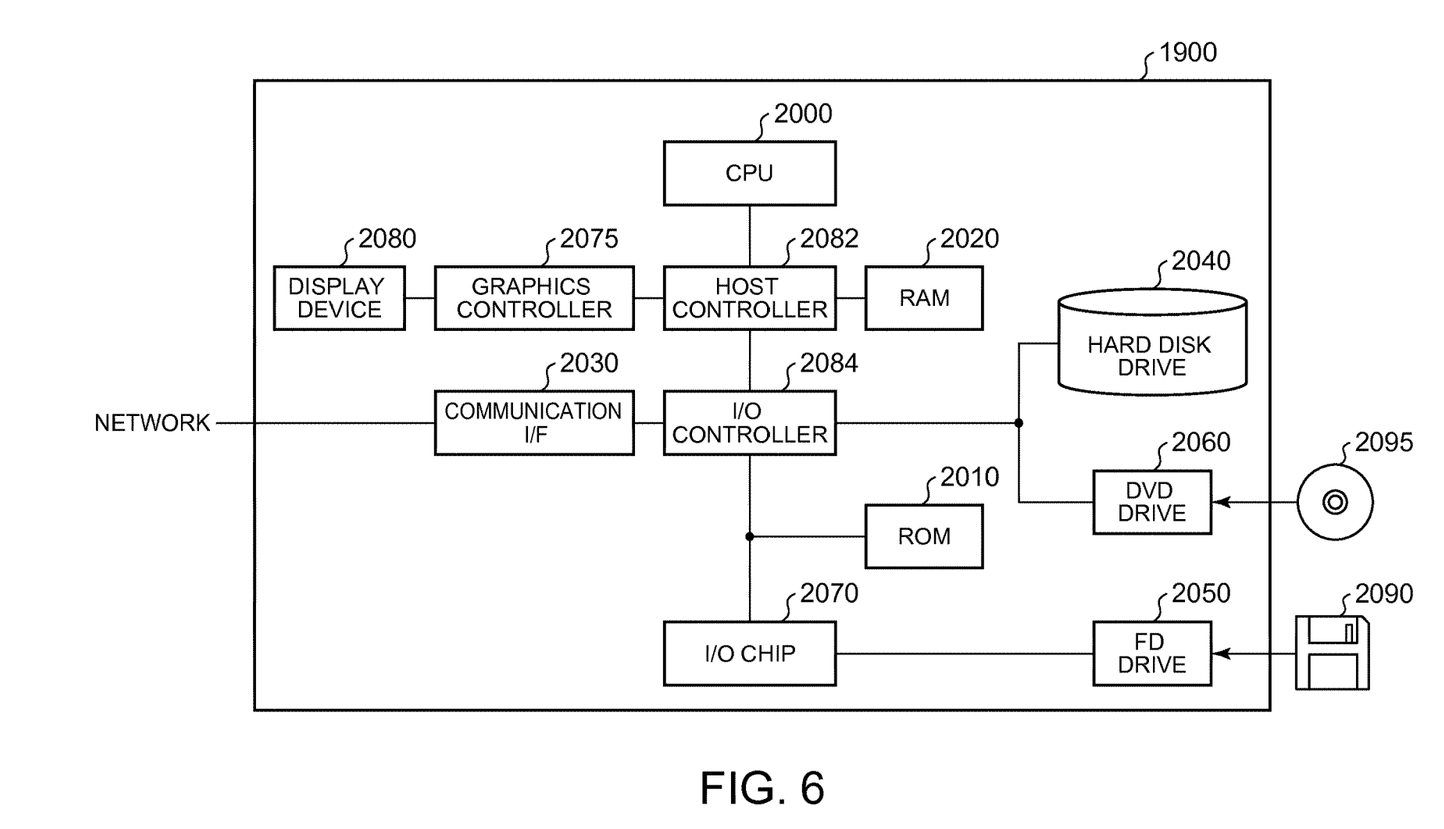
FIG. 6 shows an example of the hardware configuration of a computer 1900.

FIG. 6 shows an example of the hardware configuration of a computer 1900 functioning as the generation apparatus 100 according to the embodiment. The computer 1900 according to the embodiment includes: a CPU peripheral section having a CPU 2000, a RAM 2020, a graphics controller 2075, and a display device 2080, which are interconnected by a host controller 2082; an I/O section having a communication interface 2030, a hard disk drive 2040, and a DVD drive 2060, which are connected to the host controller 2082 through an I/O controller 2084; and a legacy I/O section having a ROM 2010, a flexible disk drive 2050, and an I/O chip 2070 connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and the RAM 2020 to control each section. The graphics controller 2075 acquires image data generated on a frame buffer provided in the RAM 2020 by the CPU 2000 or the like, and displays the image on the display device 2080. Alternatively, the graphics controller 2075 may include therein a frame buffer for storing image data generated by the CPU 2000 or the like.

The I/O controller 2084 connects the host controller 2082 with the communication interface 2030, the hard disk drive 2040, and the DVD drive 2060 as relatively high-speed I/O units. The communication interface 2030 communicates with other apparatuses through a network. The hard disk drive 2040 stores programs and data used by the CPU 2000 in the computer 1900. The DVD drive 2060 reads a program or data from a DVD-ROM 2095 and provides the read program or data to the hard disk drive 2040 through the RAM 2020.

Also connected to the I/O controller 2084 are relatively low-speed I/O units, i.e., the ROM 2010, the flexible disk drive 2050, and the I/O chip 2070. The ROM 2010 stores a boot program executed when the computer 1900 starts, and/or programs and the like depending on the hardware of the computer 1900. The flexible disk drive 2050 reads a program or data from a flexible disk 2090, and provides the program or data to the hard disk drive 2040 through the RAM 2020. The I/O chip 2070 connects not only the flexible disk drive 2050 to the I/O controller 2084, but also various I/O devices to the I/O controller 2084 through a parallel port, a serial port, a keyboard port, and a mouse port, for example.

A program provided to the hard disk drive 2040 through the RAM 2020 is provided by a user in the form of being stored on a recording medium, such as the flexible disk 2090, a DVD-ROM 2095, or an IC card. The program is read from the recording medium, installed in the hard disk drive 2040 within the computer 1900 through the RAM 2020, and executed by the CPU 2000.

The program is installed on the computer 1900 to cause the computer 1900 to function as the text acquisition section 110, the decomposition processing section 120, the learning processing section 130, the storage section 140, the keyword storage section 142, the template storage section 144, the target data acquisition section 210, the identification section 220, the selection section 230, the generation section 240, the input section 250, the correction section 260, and the addition section 270.

Information processes described in the program are read into the computer 1900 to function as specific means implemented by software in corporation with the above-mentioned various hardware resources, i.e., as the text acquisition section 110, the decomposition processing section 120, the learning processing section 130, the storage section 140, the keyword storage section 142, the template storage section 144, the target data acquisition section 210, the identification section 220, the selection section 230, the generation section 240, the input section 250, the correction section 260, and the addition section 270. Then, information is computed or processed by the specific means depending on the intended use of the computer 1900 in the embodiment to build a specific instance of generation apparatus 100 according to the intended use.

As an example, when the computer 1900 communicates with an external device or the like, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a send buffer area or the like provided in a storage device, such as the RAM 2020, the hard disk drive 2040, the flexible disk 2090, or the DVD-ROM 2095, to send the data to a network, or writes receive data received from the network to a receive buffer area or the like provided in the storage device. Thus, the communication interface 2030 may transfer data exchanged with the storage device by the DMA (Direct Memory Access) method. Alternatively, the CPU 2000 may read data from the storage device or the communication interface 2030 as a source, and write the data to the communication interface 2030 or the storage device as a destination to transfer the send/receive data.

Further, the CPU 2000 reads, into the RAM 2020, all or necessary parts from files or databases stored in an external storage device, such as the hard disk drive 2040, the DVD drive 2060 (DVD-ROM 2095), or the flexible disk drive 2050 (flexible disk 2090), by means of DMA transfer or the like to perform various processing on the data on the RAM 2020. Then, the CPU 2000 saves the processed data back to the external storage device by means of DMA transfer or the like. In such processing, the RAM 2020 can be considered to temporarily hold the content of the external storage device. Therefore, in the embodiment, the RAM 2020, the external storage device, and the like are collectively referred to as the memory, the storage section, the storage device, or the like. Various programs and various kinds of information, such as data, tables, and databases, in the embodiment are stored in such a storage device as targets of information processing. Note that the CPU 2000 can also hold part of the content of the RAM 2020 in a cache memory to perform reading and writing on the cache memory. Even in such a form, since the cache memory serves as part of the function of the RAM 2020, the cache memory shall be included in the RAM 2020, the memory, and/or the storage device in the embodiment unless otherwise denoted distinctively.

Further, the CPU 2000 performs various processing on the data read from the RAM 2020 as specified in a sequence of instructions of a program including various arithmetic operations, information processing, conditional determinations, and searching and replacing information described in the embodiment, and saves the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, the CPU 2000 can retrieve information stored in a file or a database in the storage device. For example, when two or more entries are stored in the storage device in such a manner to associate the attribute value of a second attribute with the attribute value of a first attribute, the CPU 2000 searches the two or more entries stored in the storage device for an entry with the attribute value of the first attribute matching with a specified condition to read the attribute value of the second attribute stored in the entry so that the attribute value of the second attribute associated with the first attribute that meets the predetermined condition can be obtained.

The programs or modules mentioned above may also be stored on an external recording medium. As the recording medium, an optical recording medium, such as DVD, Blu-ray (registered trademark), or CD, a magnetooptical recording medium such as MO, a tape medium, or a semiconductor memory such as an IC card can be used in addition to the flexible disk 2090 and the DVD-ROM 2095. Further, a storage device, such as a hard disk or a RAM provided in a server system connected to a private communication network or the Internet may also be used as a recording medium to provide a program to the computer 1900 through the network.

While the present invention has been described with reference to the embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

The execution sequence of processes, such as operations, procedures, steps, and stages in the apparatus, system, program, and method described in the appended claims and the specification, and shown in the accompanying drawings are not particularly specified as "ahead of," "prior to," or the like. It should be noted that the operations and the like can be carried out in any order unless output of the previous process is used in the subsequent process. Even when the description is made using "first," "next," and the like in the appended claims, the specification, and the operation flows in the drawings for convenience sake, it does not mean that it is imperative to carry out the operations and the like in this order.

What is claimed is:

1. A generation apparatus for generating a target text representing target data, comprising:
    a central processing unit in communication with a random-access memory;
    a decomposition processing section for decomposing each of multiple texts into a keyword and a template using natural language processing;
    a keyword storage section for storing keywords belonging to each of multiple categories in association with the category, respectively;
    a template storage section for storing templates obtained by decomposing the multiple texts, wherein the decomposition processing section detects a keyword stored in the keyword storage section from each of the multiple texts to determine a template based on portions other than the keyword portion in each text;
    a correction section for correcting orthographical variants of a keyword and a template obtained by newly decomposing a text based on at least either a keyword stored in the keyword storage section or a template stored in the template storage section, wherein when edit distance between the template obtained by newly decomposing the text and the template stored in the template storage section is less than a predetermined reference distance, the correction section determines that these templates are identical, and wherein when edit distance between a keyword obtained by decomposing a portion of text and a stored keyword is less than a predetermined reference distance, determining that the keyword obtained by decomposing a portion of text and the stored keyword are identical;
    a learning processing section for learning, based on acquired statistics and by regression analysis, a classification model to select a template based on a category of the keyword, wherein the acquired statistics are indicative of co-occurrences of sets of keywords, correlation between keywords, and increase or decrease in an event corresponding to each keyword, and wherein the classification model is configured to provide a corresponding objective variable for an explanatory variable, wherein the explanatory variable is generated according to a combination of keywords and the objective variable is generated according to a corresponding template, wherein the explanatory variable is a column vector with a number of dimensions determined based on the maximum value of categories in the corresponding template, the types of categories, and the types of statistics used;
    an identification section for identifying a target keyword representing the target data wherein the target keyword is a new word that does not exist in a database;
    a target data acquisition section for acquiring a target statistic as a statistic of an event corresponding to the target keyword in the target data, wherein the acquired target statistic is indicative of at least one of: a number of co-occurrences of a target keyword in a set of target keywords, a correlation between keywords in a set of target keywords, an increase in an event corresponding to the target keyword, and a decrease in an event corresponding to the target keyword;
    a selection section for selecting a target template used to represent the target data based on an explanatory variable using the classification model, wherein the explanatory variable is generated based on the target keyword and target statistic;
    a generation section for generating the target text representing the target data based on the target template and the target keyword;
    an input section allowing for user input to modify target text, wherein the provided input section includes, while a user in entering text, an input candidate and one or more of: a stored keyword and a stored template;
    an addition section for newly adding, as one of the multiple texts, the target text generated by the generation section or a text altered by the user from the target text, wherein the learning processing section learns the classification model again using the multiple texts with the text added by the addition section to improve accuracy of the classification model.

* * * * *